(12) United States Patent
Clark et al.

(10) Patent No.: US 10,078,494 B2
(45) Date of Patent: Sep. 18, 2018

(54) SECURE TRUE RANDOM NUMBER GENERATION USING 1.5-T TRANSISTOR FLASH MEMORY

(71) Applicants: Lawrence T. Clark, Phoenix, AZ (US);
James Adams, Phoenix, AZ (US);
Keith E. Holbert, Gilbert, AZ (US)

(72) Inventors: Lawrence T. Clark, Phoenix, AZ (US);
James Adams, Phoenix, AZ (US);
Keith E. Holbert, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 71 days.

(21) Appl. No.: 15/276,087

(22) Filed: Sep. 26, 2016

(65) Prior Publication Data

US 2017/0090873 A1 Mar. 30, 2017

Related U.S. Application Data

(60) Provisional application No. 62/232,736, filed on Sep. 25, 2015.

(51) Int. Cl.
 *G06F 7/58* (2006.01)
(52) U.S. Cl.
 CPC .................... *G06F 7/588* (2013.01)
(58) Field of Classification Search
 None
 See application file for complete search history.

(56) References Cited

U.S. PATENT DOCUMENTS

| 9,823,899 B2 * | 11/2017 | Katoh | G06F 7/588 |
| 2010/0281088 A1 * | 11/2010 | Wilber | G06F 7/588 |
| | | | 708/251 |
| 2011/0157992 A1 * | 6/2011 | Strasser | G06F 1/183 |
| | | | 365/185.18 |

(Continued)

OTHER PUBLICATIONS

Anderson, Ross, et al., "Low Cost Attacks on Tamper Resistant Devices," 5th International Workshop on Security Protocols, Apr. 7-9, 1997, Paris, France, Springer LNCS, pp. 125-136.

(Continued)

*Primary Examiner* — David H Malzahn
(74) *Attorney, Agent, or Firm* — Withrow & Terranova, P.L.L.C.

(57) ABSTRACT

This disclosure relates generally to physically unclonable function (PUF) circuitry along with methods of generating numbers. In one embodiment, the PUF circuitry includes a memory, a memory control circuitry, and whitening circuitry. To reduce or eliminate the systematic bias from the array, whitening circuitry is configured to generate a random number comprising random number bits in response to the memory control circuit implementing at least one sequence of memory cycles on the array of the memory cells in the memory. The whitening circuitry is configured to provide the random number bits of the random number based on the variable bit states stored by the array of the memory cells. On average the whitening circuitry is configured to provide approximately half of the random number bits in the first bit state and half of random number bits in a second bit state.

20 Claims, 8 Drawing Sheets

(56) References Cited

U.S. PATENT DOCUMENTS

| | | | | |
|---|---|---|---|---|
| 2014/0056068 A1* | 2/2014 | Strasser | ............. | G06F 11/1048 |
| | | | | 365/185.03 |
| 2017/0090873 A1* | 3/2017 | Clark | ...................... | G06F 7/588 |
| 2017/0242660 A1* | 8/2017 | Katoh | ..................... | G06F 7/588 |
| 2017/0301406 A1* | 10/2017 | Wong | ................. | H01L 23/5226 |

OTHER PUBLICATIONS

Chellappa, Srivatsan, et al., "Improved Circuits for Microchip Identification using SRAM Mismatch," Custom Integrated Circuits Conference, Sep. 2011, IEEE, 4 pages.

Gassend, Blaise, et al., "Controlled Physical Random Functions and Applications," ACM Transactions on Information and System Security, vol. 10, Issue 4, Jan. 2008, ACM, New York, New York, 22 pages.

Holcomb, Daniel, et al., "Power-Up SRAM State as an Identifying Fingerprint and Source of True Random Numbers," IEEE Transactions on Computers, vol. 58, Issue 9, Sep. 2009, pp. 1198-1210.

Lofstrom, Keith, et al., "IC Identification Circuit Using Device Mismatch," Solid-State Circuits Conference, Digest of Technical Papers, Feb. 9, 2000, IEEE, 2 pages.

Rosenblatt, Sami, et al., "A Self-Authenticating Chip Architecture Using an Intrinsic Fingerprint of Embedded DRAM," IEEEE Journal of Solid-State Circuits, vol. 48, Issue 11, Nov. 2013, IEEE, pp. 2934-2943.

Ruhrmair, Ulrich, et al., "Modeling Attacks on Physical Unclonable Functions," Proceedings of the 17th ACM Conference on Computer and Communication Security, Oct. 4-8, 2010, Chicago, Illinois, ACM, pp. 237-249.

Rukhin, Andrew, et al., "A Statistical Test Suite for Random and Pseudorandom Number Generators for Cryptographic Applications," Special Publication 800-22, Revision 1a, Apr. 2010, National Institute of Standards and Technology, 131 pages.

Nang, Yinglei, et al., "Flash Memory for Ubiquitous Hardware Security Functions: True Random Number Generation and Device Fingerprints," Symposium on Security and Privacy, May 20-23, 2012, IEEE Computer Society, Washington, DC, 15 pages.

Author Unknown, "Security Requirements for Cryptographic Modules," Federal Information Processing Standards Publication, 140-2, May 25, 2001, National Institute of Standards and Technology, 69 pages.

\* cited by examiner

US 10,078,494 B2

SECURE TRUE RANDOM NUMBER GENERATION USING 1.5-T TRANSISTOR FLASH MEMORY

RELATED APPLICATIONS

This application claims the benefit of provisional patent application Ser. No. 62/232,736, filed Sep. 25, 2015, the disclosure of which is hereby incorporated herein by reference in its entirety.

GOVERNMENT SUPPORT

This invention was made with government support under DE-NE0000679 awarded by the Department of Energy. The government has certain rights in the invention.

FIELD OF THE DISCLOSURE

This disclosure relates generally to physically unclonable function (PUF) circuitry along with methods of generating numbers.

BACKGROUND

This disclosure relates generally to physically unclonable function (PUF) circuitry along with methods of generating numbers. In one embodiment, the PUF circuitry includes a memory, a memory control circuitry, and whitening circuitry. The memory includes an array of memory cells operable to store variable bit states. To generate one or more random numbers, the memory control circuit is configured to reset the array of memory cells so that the variable bit states stored by the array of memory cells are each provided in a first bit state. Then, the memory control circuit implements at least one sequence of memory cycles on the array of the memory cells so that some of the variable bit states are retained in the first bit state and some of the variable bit states are each changed to a second bit state. However, in certain regions of the array, the memory cells may be biased toward the first bit state or the second bit state.

To reduce or eliminate the bias from the array, whitening circuitry is configured to generate a random number comprising random number bits in response to the memory control circuit implementing the at least one sequence of memory cycles on the array of the memory cells. The whitening circuitry is configured to provide the random number bits of the random number based on the variable bit states stored by the array of the memory cells, such that on average the whitening circuitry is configured to provide approximately half of the random number bits in the first bit state and half of random number bits in the second bit state. The whitening circuitry increases a quality of the randomness of random numbers generated by the PUF circuitry as quantified by National Institute of Standards and Technology (NIST) randomness tests. Furthermore, the whitening circuitry allows for robust memory types to be used such as flash memory, which is not subject to stress-induced leakage current (SILC) or other common aging defects.

SUMMARY

This disclosure relates generally to physically unclonable function (PUF) circuitry along with methods of generating random numbers. In one embodiment, the PUF circuitry includes a memory, a memory control circuit, and whitening circuitry. The memory includes an array of memory cells operable to store variable bit states. To generate one or more random numbers, the memory control circuit is configured to reset the array of memory cells so that the variable bit states stored by the array of memory cells are each provided in a first bit state. Then, the memory control circuit implements at least one sequence of memory cycles on the array of the memory cells so that some of the variable bit states are retained in the first bit state and some of the variable bit states are each changed to a second bit state. However, in certain regions of the array, the memory cells may be systematically biased toward the first bit state or the second bit state.

To reduce or eliminate the systematic bias from the array when generating the random numbers, the whitening circuitry is configured to generate a random number comprising random number bits in response to the memory control circuit implementing the at least one sequence of memory cycles on the array of the memory cells. The whitening circuitry is configured to provide the random number bits of the random number based on the variable bit states stored by the array of the memory cells. However, on average the whitening circuitry is configured to provide approximately half of the random number bits in the first bit state and half of random number bits in the second bit state. The whitening circuitry increases a quality of the randomness of random numbers generated by the PUF circuitry as quantified by National Institute of Standards and Technology (NIST) randomness tests.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
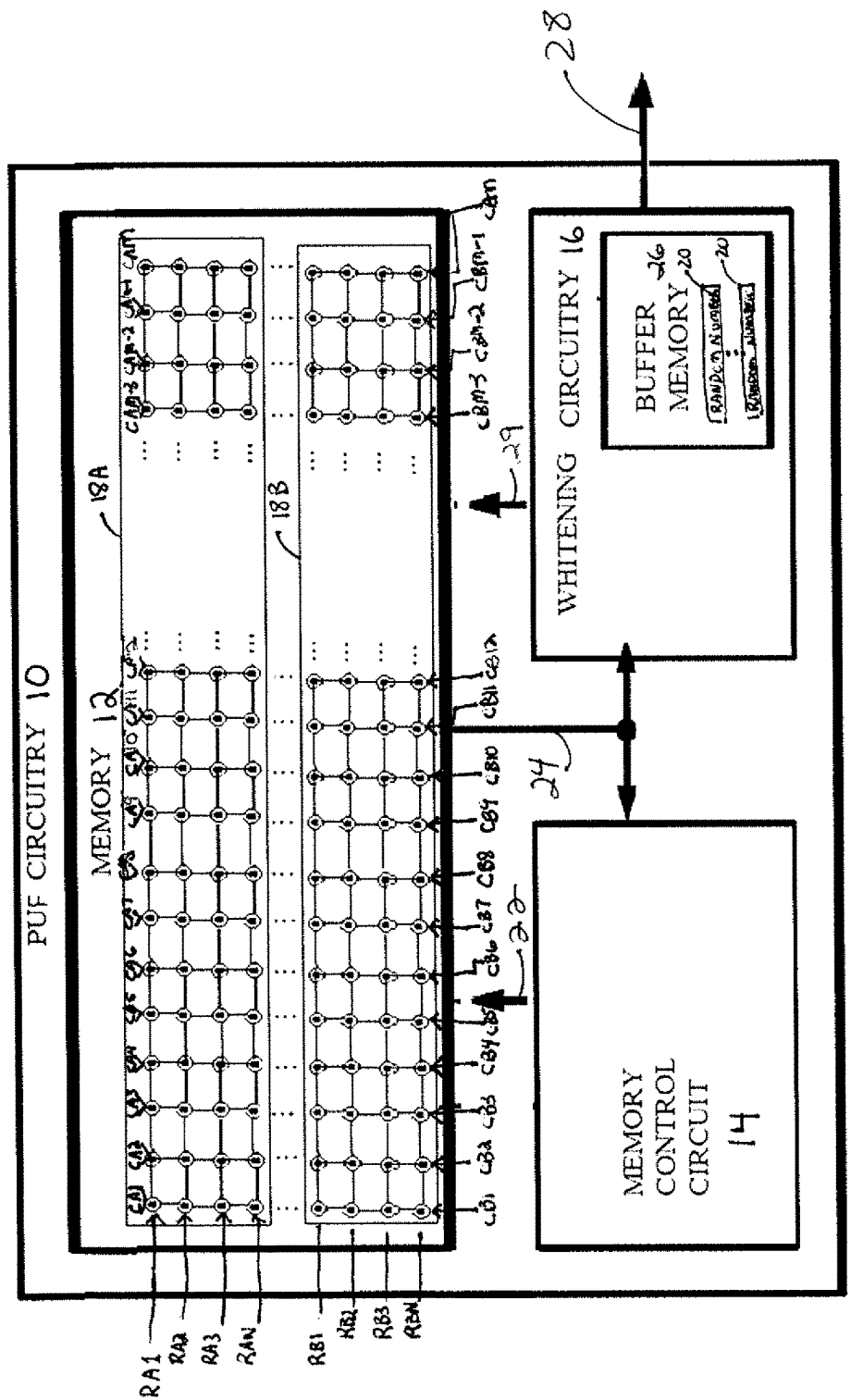
FIG. 1 illustrates one embodiment of physically unclonable function (PUF) circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Throughout this disclosure, relative terminology, such as "approximately," "substantially," and the like, may be used with a predicate to describe features and relationships between features of a device or method. The relative terminology used with the predicate should be interpreted sensu lato. However, whether the predicate as modified by the relative terminology is satisfied is determined in accordance to error ranges and/or variation tolerances relevant to the predicate and/or prescribed to the device or method by industry standards relevant to the application(s) employing the device or method. For example, the particular application employing the device or method may be designed to operate in accordance with certain industry standards, specifications, or the like. These industry standards and specification may prescribe the error ranges and/or variation tolerances relevant to the predicate or may describe performance parameters relevant to the predicate from which the error ranges and/or variation tolerances for determining the criteria for the predicate as modified by the terminology can be deduced or inferred.

This disclosure relates generally to physically unclonable function (PUF) circuitry along with methods of generating random numbers. In one embodiment, the PUF circuitry includes a memory, a memory control circuit, and whitening circuitry. The memory includes an array of memory cells operable to store variable bit states. To generate one or more random numbers, the memory control circuit is configured to reset the array of memory cells so that the variable bit states stored by the array of memory cells are each provided in a first bit state. Then, the memory control circuit implements at least one sequence of memory cycles on the array of the memory cells so that some of the variable bit states are retained in the first bit state and some of the variable bit states are each changed to a second bit state. However, in certain regions of the array, the memory cells may be systematically biased toward the first bit state or the second bit state.

To reduce or eliminate the systematic bias from the array when generating the random numbers, the whitening circuitry is configured to generate a random number comprising random number bits in response to the memory control circuit implementing the at least one sequence of memory cycles on the array of the memory cells. The whitening circuitry is configured to provide the random number bits of the random number based on the variable bit states stored by the array of the memory cells. However, on average the whitening circuitry is configured to provide approximately half of the random number bits in the first bit state and half of random number bits in the second bit state. The whitening circuitry increases a quality of the randomness of random numbers generated by the PUF circuitry as quantified by National Institute of Standards and Technology (NIST) randomness tests.

FIG. 1 illustrates one embodiment of PUF circuitry 10. The PUF circuitry 10 includes memory 12, a memory control circuit 14, and whitening circuitry 16. The memory 12 includes an array of memory cells (where each memory cell is represented as a circle in the array within the memory 12 shown in FIG. 1). Each of the memory cells in the array is operable to store variable bit states (each variable bit state is represented as a black dot within each memory cell of the memory 12 in FIG. 1). Thus, each of the variable bit states stored by the memory cells in the memory 12 may vary between a first bit state (e.g., a high voltage state or a low voltage state) corresponding to a first logical value (e.g., logic "1" or logic "0") and a second bit state (e.g., a low voltage state or a high voltage state) corresponding to a second logic value (e.g., logic "0" or logic "1"). The first logic value and the second logic value are considered to be antipodal and thus the first bit state and the second bit state are antipodal.

In this embodiment, the array of memory cells is organized into an memory cell rows and memory cell columns. Furthermore, the memory 12 has a first memory block 18A and a second memory block 18B. The first memory block 18A includes a first subarray of memory cells that can also be referred as being organized into memory cell rows (referred to generally, generically, or collectively as memory cell rows RA and specifically as memory cell rows RA1-RAN) and into memory cell columns (referred to generally, generically, or collectively as memory cell columns CA and specifically as memory cell columns CA1-CAM). Similarly, the second memory block 18B includes a second subarray of memory cells that organized into memory cell rows (referred to generally, generically, or collectively as memory cell rows RB and specifically as memory cell rows RB1-RBN) and into memory cell columns (referred to generally, generically, or collectively as memory cell columns CB and specifically as memory cell columns CB1-CBM). In this embodiment, the memory cell rows RA of the first memory block 18A and the memory cell rows RB of the second memory block 18B are memory cell rows of the array of memory cells. Also, a number of memory cell rows RA of the first memory block 18A and a number of memory cell rows RB of the second memory block 18B are both equal to an integer number N. In this embodiment, the memory cell columns CA of the first memory block 18A and the memory cell columns CB of the second memory block 18B are subcolumns of the array of memory cells. Also, a number of memory cell columns CA of the first memory block 18A and a number of memory cell columns CB of the second memory block 18B are both equal to an integer number M. Thus, each memory cell column of the memory cells in the array of the memory cells includes one of the memory cell columns CA of the first memory block 18A and one of the memory cell columns CB of the second memory block 18B.

Each of the memory cells in the array of memory cells has a physical characteristic and this physical characteristic varies between each of the memory cells due to manufacturing variation. The manufacturing variation between the physical characteristic of memory cells in the memory 12 is used to generate one or more random numbers as explained below. Considering a population of PUF circuitry each formed in the same manner as the PUF circuitry 10 shown in FIG. 1 and on different ICs, then the resulting random numbers provided by each PUF circuitry in the population of PUF circuitry is based on as-fabricated manufacturing variation in the physical characteristics of a specific integrated circuit (IC) since different random fabrication process-induced manufacturing variations of the physical characteristic among the memory cells will result in unclonable variation in the random numbers generated by the PUF circuitry which cannot be guessed. Accordingly, the PUF circuitry 10 shown in FIG. 12 is also known as a true random number generator (TRNG) since the random numbers generated by the PUF circuitry 10 is based on truly random physical phenomenon.

To generate one or more random numbers, the memory control circuit 14 is configured to reset the array of memory cells in the memory 12 so that the variable bit states stored by the array of memory cells are each provided in a first bit state. Thus, for example, each of the memory cells in the first subarray of memory cells of the first memory block 18A and each of the memory cells in the second subarray of memory cells the second memory block 18B are programmed to a first bit state.

The memory control circuit 14 is configured to implement at least one sequence of memory cycles on the array of memory cells in response to resetting the array of memory cells so that some of the variable bit states are retained in the first bit state and some of the variable bit states are changed to a second bit state. In one implementation, the memory control circuit 14 is configured to implement at least one sequence of memory cycles on the array of memory cells in response to resetting the array of memory cells so that approximately 50% of the variable bit states are retained in the first bit state and approximately 50% of the variable bit states are changed to a second bit state, where the second bit state is antipodal to the first bit state. During each memory cycle, the memory control circuit 14 generates a memory control output 22 that is configured to switch the first bit state to the second bit state but a voltage of the memory control output 22 is such that whether and how many memory cycles it takes for a memory cell to switch from the first bit state to the second bit state depends on the physical characteristic of the memory cell where the effectiveness of the memory control output 22 is such so as to vary in accordance within the manufacturing variation of the physical characteristic.

Whether and how many memory cycles it takes for the memory cells to change from the first bit state to the second bit state is dependent on the physical characteristic and its manufacturing variation. However, certain definable regions of the array of memory cells may be systematically biased towards retaining the first bit state or towards the second bit state simply due to constraints in the physical characteristic during manufacturing within the regions.

In order to reduce or eliminate the systematic bias, the whitening circuitry 16 is configured to generate one or more random numbers 20 in response to the memory control circuit 14 implementing the at least one sequence of memory cycles on the array of memory cells of the memory 12. Each random number includes random number bits. The whitening circuitry 16 is configured to provide the random number bits of the random numbers 20 based on the variable bit states stored by the array of the memory cells of the memory 12. However, the whitening circuitry 16 is configured such that on average the whitening circuitry 16 provides approximately half of the random number bits in the first bit state and half of random number bits in the second bit state.

For instance, the memory control circuit 14 is configured to implement a first sequence of memory cycles on the first subarray of memory cells in the first memory block 18A so that approximately 50% of the variable bit states of the memory cells in the first subarray within the first memory block 18A are retained in the first bit state and so that approximately 50% of the variable bit states of the memory cells in the first subarray within the first memory block 18A are changed to the second bit state. To do this, after each memory cycle, the memory 12 is configured to generate a memory output 24 where the memory output 24 indicates the variable bit states of the memory cells in the first subarray within the first memory block 18A. If the variable bit states of the memory cells in the first subarray within the first memory block 18A are less than the closest the first memory block 18A can be to 50% of the memory cells being in the second bit state, the memory control circuit 14 implements another memory cycle. The memory cycles are repeated on the memory cells in the first subarray within the first memory block 18A until the memory cells in the first subarray within the first memory block 18A that are in the second bit state are as close to 50% as possible.

Additionally, the memory control circuit 14 is configured to implement a second sequence of memory cycles on the second subarray of memory cells in the second memory block 18B so that approximately 50% of the variable bit states of the memory cells in the second subarray within the second memory block 18B are retained in the first bit state and so that approximately 50% of the variable bit states of the memory cells in the second subarray within the second memory block 18B are changed to the second bit state. To do this, after each memory cycle, the memory 12 is configured to generate the memory output 24 where the memory output 24 indicates the variable bit states of the memory cells in the second subarray within the second memory block 18B. If the variable bit states of the memory cells in the second subarray within the second memory block 18B are less than the closest the second memory block 18B can be to 50% of the memory cells being in the second bit state, the memory control circuit 14 implements another memory cycle. The memory cycles are repeated on the memory cells in the second subarray within the second memory block 18B until the memory cells in the second subarray within the second memory block 18B that are in the second bit state are as close to 50% as possible.

The whitening circuitry 16 is configured to generate one or more random numbers 20 in response to the memory control circuit 14 implementing the first sequence of memory cycles on the memory cells of the first subarray within the first memory block 18A and the second sequence of memory cycles on the memory cells of the second subarray within the second memory block 18B. Each random number includes random number bits. The whitening circuitry 16 is configured to provide the random number bit based on the variable bit states stored by the array of the memory cells of the memory 12. However, the whitening circuitry 16 is configured such that on average the whitening circuitry 16 is configured to provide approximately half of the random number bits in the first bit state and half of random number bits in the second bit state. In other words, the whitening circuitry 16 is configured to eliminate the systematic bias in the first bit state or the second bit state based on the region of the array of the memory cells when generating the random numbers 20.

In one embodiment, the memory 12 is flash memory and each of the memory cells in the array of memory cells is a flash memory cell. Each of the memory cycles is a partial memory erase cycle, where e the memory cells in the array of memory cells is erased through Fowler-Nordheim tunneling. The physical characteristic that determines whether the memory cells is switched from the first bit state to the second bit state is a tunnel oxide layer within the memory cell. The rate at which the memory cells switch from the first bit state to the second bit stance is a function of thickness and geometry of the tunnel oxide layer within each flash memory cell. The specific geometries of the flash memory cells provide a higher point electric field and thus allow high erase efficiency with a greater oxide thickness than for conventional flash memories. Consequently, the storage is robust since it is not subject to stress-induced leakage current (SILC) or other common flash aging defects.

Each memory cycle is a partial memory cycle, where the memory control output 22 is an erase voltage applied to each of the memory cells within the first memory block 18A or the second memory block 18B. The erase voltage of the partial memory cycle in the first sequence of memory cycles and the second sequence of memory cycles is lower than an erase voltage utilized during a standard erase cycle. Furthermore, a duration of each of the partial erase cycles in the first sequence and a duration of each of the partial erase cycles in the second sequence is less than the duration of the standard erase cycle. Again the erase voltage and the duration of the partial erase cycles should be provided so that switching from the first bit state to the second bit state is depends on the manufacturing variation of the physical characteristic.

By reducing the erase voltage and the duration of the partial erase cycles when compared to the standard erase cycles, an erase rate is reduced such that the partial erase cycles are implemented iteratively until the first sequence of the partial erase cycles and the second sequence of the partial erase cycles provide the first memory block 18A and the second memory block 18B with the memory cells as close to 50% in the second bit state as possible. However, with regard to the memory 12 being flash memory, there is systematic concentration of the memory cells in the first bit state within both the first subarray within the first memory block 18A and the second subarray within the second memory block 18B based on the memory cells physical locations within the array of memory cells provided by the memory 12. The whitening circuitry 16 is configured to implement a whitening algorithm wherein the whitening algorithm uses a group of the variable bit states in a group of the memory cells of the first subarray within the first memory block 18A and a group of the variable bit states in the memory cells of the second subarray within the second memory block 18B so that on average the random numbers 20 generated by the whitening circuitry 16 have approximately 50% of the random number bits in the first bit state and approximately 50% of the random number bits in the second bit state variable. The random numbers 20 are stored within a buffer memory 26 provided by the whitening circuitry 16. The whitening circuitry 16 is configured to generate a random number output 28 that represents one of the random numbers 20 so as to transmit a copy of the random number 20 to external circuitry. A quality of the randomness of the random numbers 20 is quantified by passing National Institute of Standards and Technology (NIST) randomness tests. The whitening circuitry 16 is configured to generate a memory control output 29 received by the memory 12 to request the memory output 24 representing the variable bit states from the memory 12.

Figure 2:
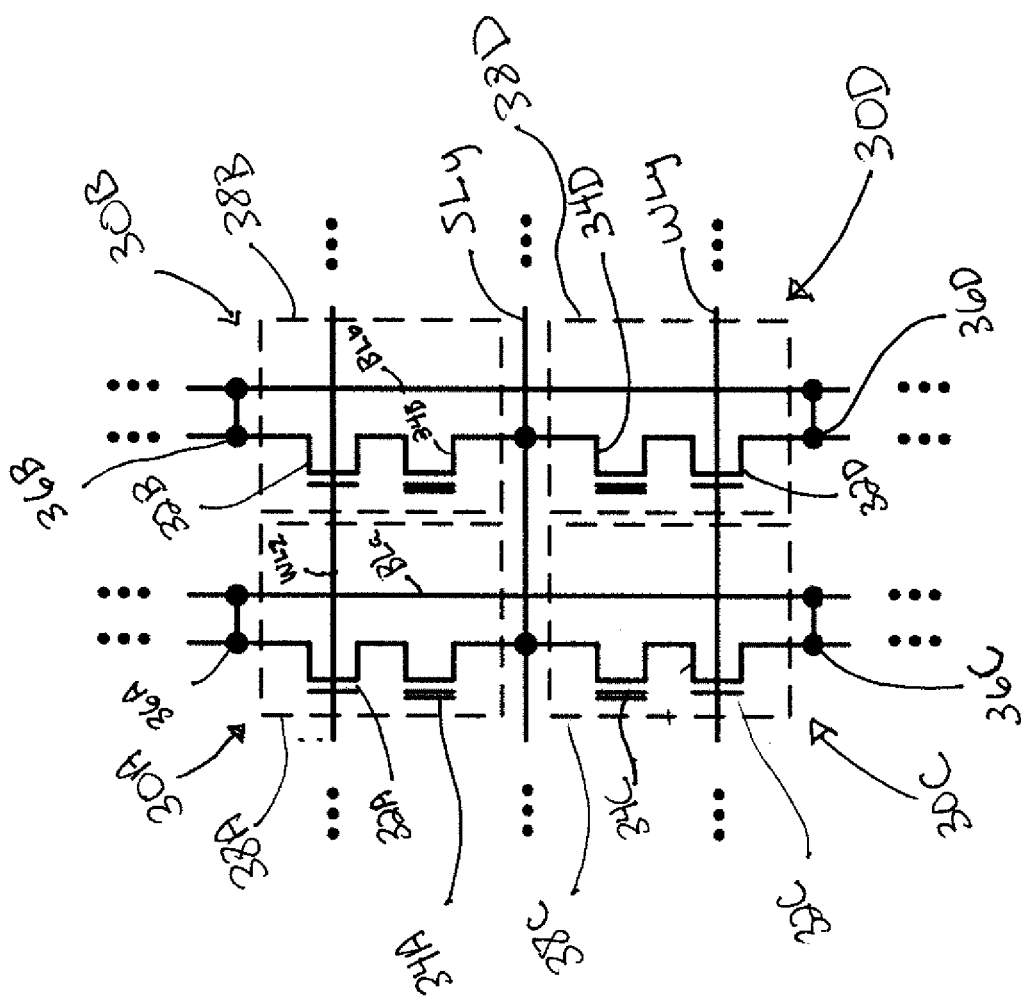
FIG. 2 illustrates a circuit diagram of flash memory cells, which may be utilized in the memory of the PUF circuitry shown in FIG. 1.

FIG. 2 illustrates a circuit diagram of several 1.5 T split gate flash memory cells (referred to generically, generically, or collectively as flash memory cells 30 and specifically as flash memory cells 30A-30D). In one embodiment of the memory 12 shown in FIG. 1, each of the memory cells in the array of memory cells is provided in the same manner as the flash memory cells 30 shown in FIG. 2. As shown in FIG. 2, each of the flash memory cells 30 includes a word line device (referred to generically, generically, or collectively as word line devices 32 and specifically as word line devices 32A-32D) and a floating gate device (referred to generically, generically, or collectively as floating line devices 34 and specifically as floating line devices 34A-34D). The word line device 32 and floating line device 34 of each of the flash memory cells 30 is connected in series between a source line SLy and a connection node (referred to generically, generically, or collectively as connection node 36 and specifically as connection node 36A-36D). Furthermore, each of the flash cells is provided in a cell region ((referred to generically, generically, or collectively as cell regions 38 and specifically as cell regions 38A-38D)). Each of the cell regions 38 is identified by an array position (i.e., cell row position, cell column position) of the flash memory cell 30 within the array of memory cells of the memory 12 (shown in FIG. 1).

Each gate of the word line devices 32 within a memory cell row of the flash memory cells 30 share a word line (generically, generically, or collectively as word lines WL and specifically as word lines WLz-WLy). Also each of the word line devices 32 in a memory cell column of the flash memory cells 30 has a drain that shares a bit line (generically, generically, or collectively as bit lines BL and specifically as bit lines BLa-BLb). Every source of each of the floating line devices 34 in adjacent memory cell rows of the flash memory cells 30 share the same source line SLy.

Figure 3:
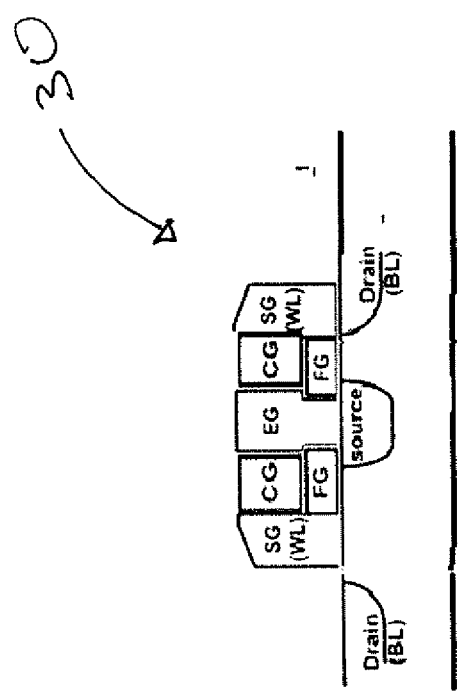
FIG. 3 illustrates a cross sectional view of any one of the flash memory cells shown in FIG. 2.

FIG. 3 illustrates a cross-sectional view of one embodiment the flash memory cell 30 which is an embodiment of each of the flash memory cells 30A-30D shown in FIG. 2. In one embodiment of the memory 12, each of the memory cells in the array provided by the memory 12 is provided in the same manner as the flash memory cell 30 shown in FIG. 2. The flash memory cell 30 includes floating gates (FG) which are coupled to a common source, which in this example is connected to a source line SL, which biases the floating gates FG. Source terminals SG are also biased by the common source line WL and are also connected to the source through the floating gates. In this embodiment, the floating gates FG are erased by removing electrons via poly to poly Fowler-Nordheim tunneling, raising the potential of the floating gates. During a standard erase cycle, the erase gate (EG) is driven to a high voltage (~11.5 V) while the bit line (BL), WL and control gate (CG) are grounded. The F-N tunneling rate is an exponential function of the effective as fabricated of the floating gates FG to erase gate EG dielectric thickness. With regards to the partial erase cycles, a duration of the partial erase cycle is significantly lower than the duration of the standard erase cycle. Furthermore, the erase voltage applied at the erase gate EG is significantly lower while the bit line BL, WL and the control gate (CG) are grounded. For example, the erase voltage applied to the erase gate EG may be approximately 2.2 volts during each of the partial erase cycles. Thus, manufacturing variation in the floating gates FG to erase gate EG thickness and geometry provides an unclonable source of randomness in the PUF circuitry 10 shown in FIG. 1.

Figure 4:
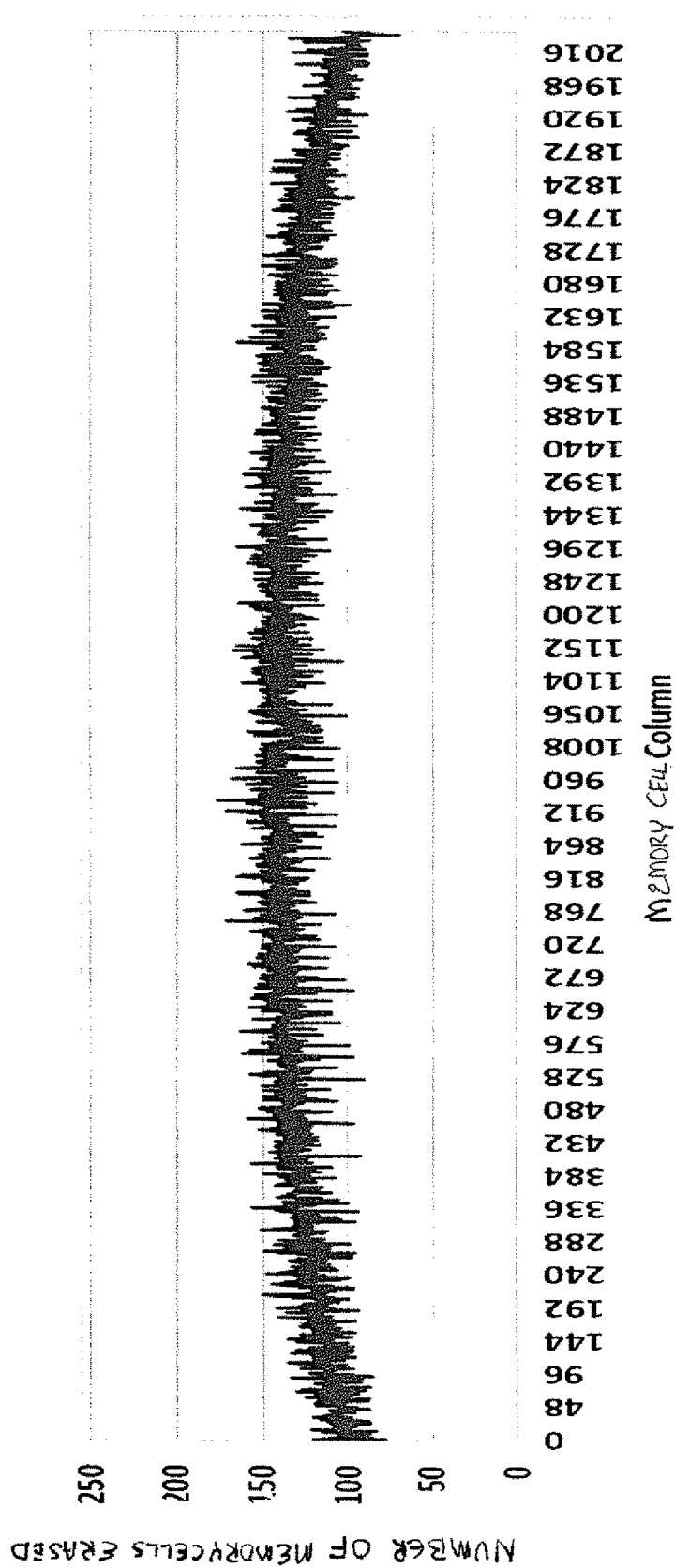
FIG. 4 is a graph that plots the number of memory cells of the memory shown in FIG. 1 erased per memory cell column.

Referring now to FIG. 1 and FIG. 4, FIG. 4 is a graph that plots the number of memory cells of the memory 12 shown in FIG. 1 erased (i.e., the number of the variable bits states provided in the second bit states) per memory cell column in response to the first sequence of partial erase cycles on the first memory block 18A and the second sequence of partial cycles on the second memory block 18B. With regards to FIG. 4, each of the memory cells in the array shown in FIG. 1 are provided like the flash memory cells 30 shown in FIG. 2 and FIG. 3. The number memory cell rows is 256 and the number of memory cell columns is 2048. As can be seen in from FIG. 4, the memory cell columns at the highest column positions and the lowest column positions are biased to have fewer numbers of memory cells that are erased. Thus, although overall the variable bit states are approximately 50% in the first bit state and approximately 50% in the second bit state, most of the memory cells with the highest column positions and the lowest column positions store variable bit states that are in the first bit state.

Furthermore, the memory cell columns at the middle most positions are biased to have fewer numbers memory cells that are erased. Thus, although overall the variable bit states are approximately 50% in the first bit state and approximately 50% in the second bit state, most of the memory cells with the middle most positions store variable bit states that are in the first bit state. The whitening circuitry 16 generates the random numbers 20 using the variable bit states that are stored in the array of the memory cells while reducing or even eliminating any the systematic bias in the random numbers due to the concentration of the memory cells storing a particular bit state with regard to the position of the memory cell within the array.

Figure 5:
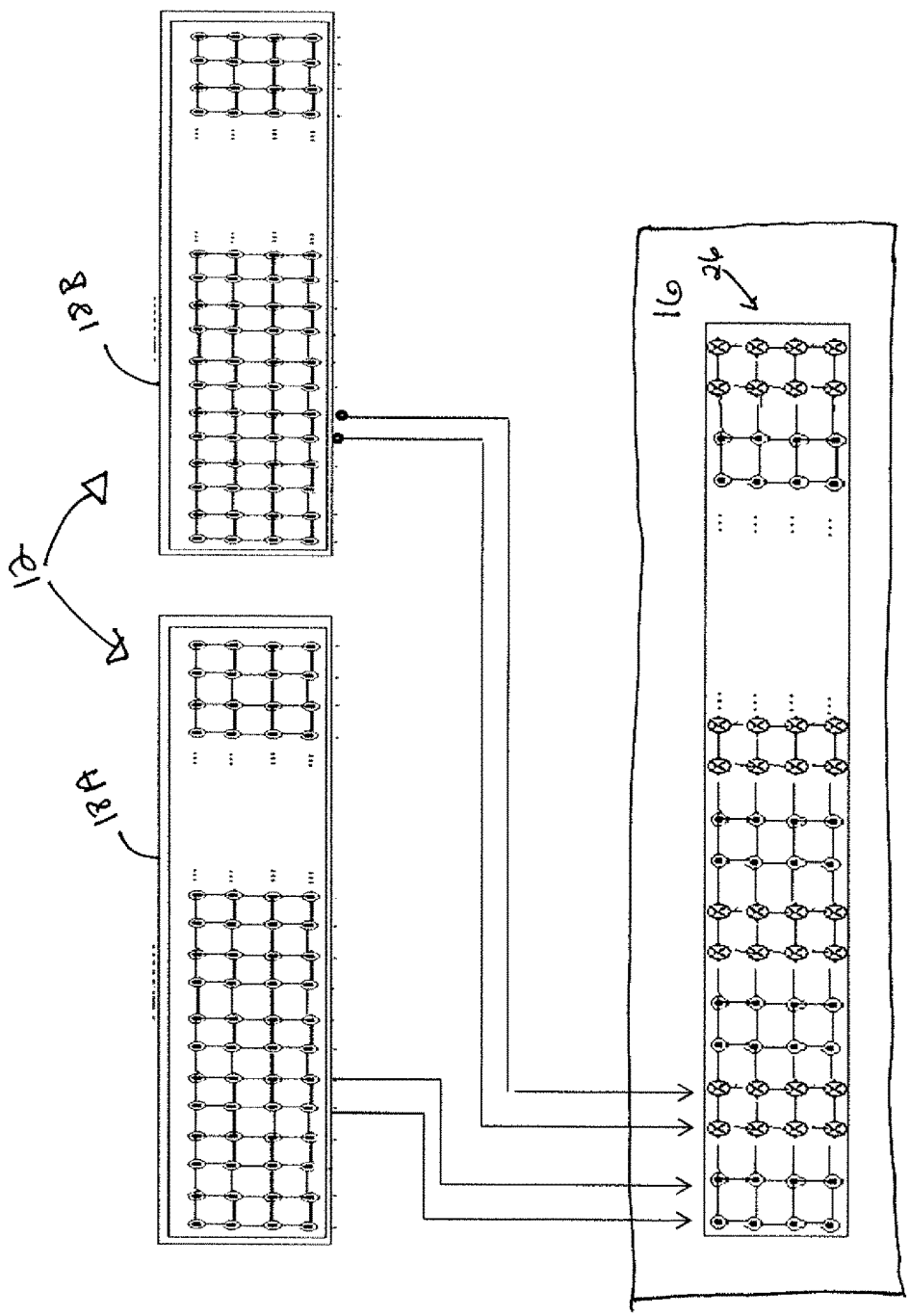
FIG. 5 illustrates an example of one type of whitening algorithm that may be implemented by one embodiment of the whitening circuitry shown in FIG. 1.

FIG. 5 illustrates an example of one type of whitening algorithm that may be implemented by one embodiment of the whitening circuitry 16 shown in FIG. 1. In this embodiment, the random numbers 20 are generated from random number bits in the buffer memory 26. In this embodiment, the random number bits of each of the random numbers 20 have bits states. Half the random number bits in each of the random numbers have bit states that are set to be the same as the variable bit states from a corresponding memory cell row and from selected memory cell columns that are provided by the first memory block 18A. These are represented as dots within the buffer memory 26. The other half the random number bits in each of the random numbers 20 have bit states that are set to be inverted with respect to the variable bit states from a corresponding memory cell row and from selected memory cell columns that are provided by the second memory block 18B. These are shown as X within the buffer memory 26. The whitening circuitry 16 interleaves the random number bits with bit states that are set based on the variable bit states from the first memory block 18A with the random number bits with bit states that are set based on the variable bit states of the second memory block 18B as shown in FIG. 5. The selected memory cell columns exclude the excluded memory cell columns. In one implementation, the excluded memory cell columns include the memory cell columns with the highest column positions and the lowest column positions. In another implementation, the excluded memory cell columns include the memory cell columns with the highest memory positions, the lowest memory positions, and the middle most memory positions. The operation for this implementation goes as follows:

```
for (memory cell row 0 to memory cell row 255)
{
    for (x = 0 to x = 784)
    {
        Append bit [memory cell row number][memory cell
        column number 160 + x] from first memory block 18A to
        the random number 20
        Append bit [memory cell row number][memory cell
        column number 1104 + x] from first memory block 18A to
        the random number 20
        Append inverted bit [memory cell row number][memory
        cell column number 160 + x] from second memory block
        18B to the random number 20
        Append inverted bit [memory cell row number][memory
        cell column number 1104 + x] from second memory block
        18B to the random number 20
    }
}
```

Figure 6:
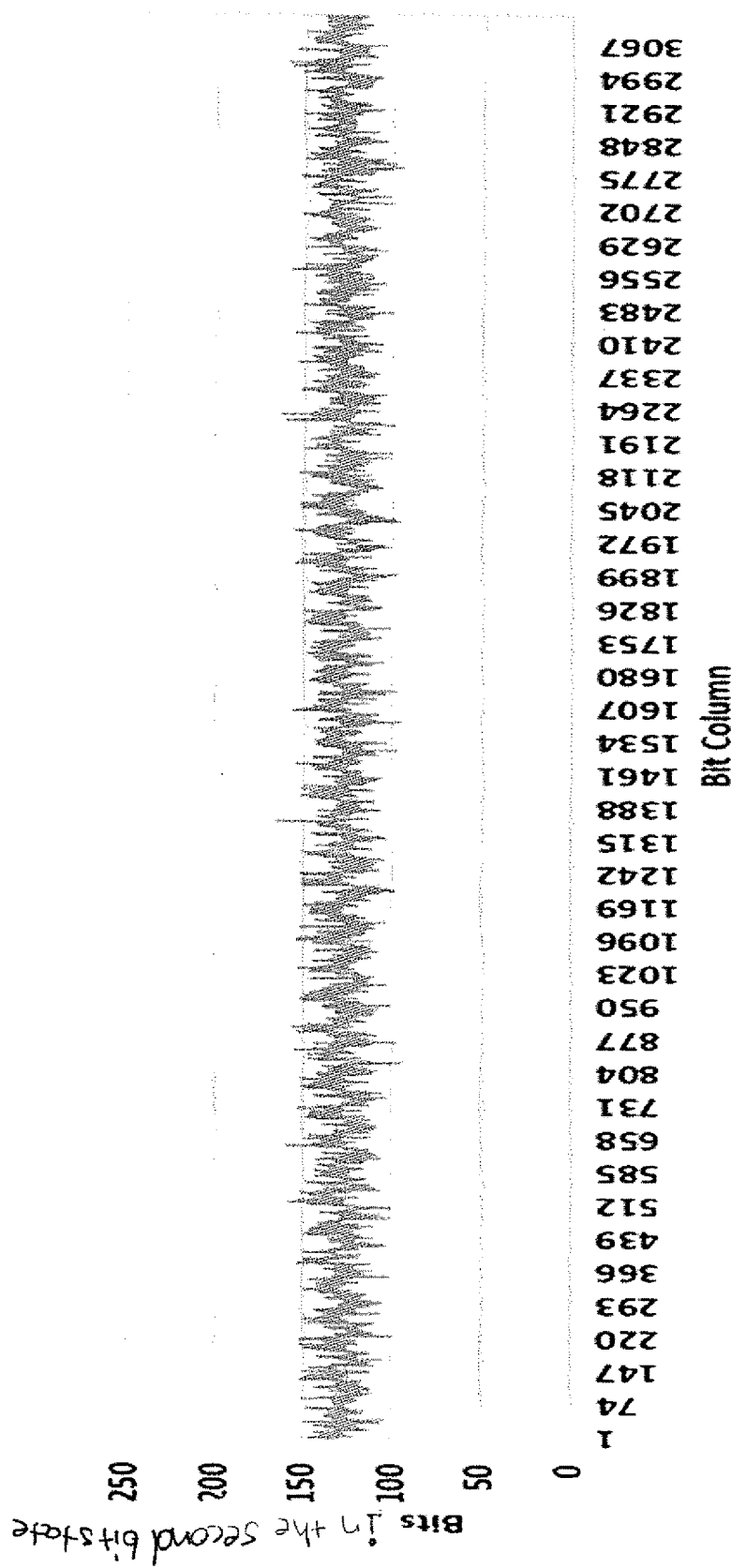
FIG. 6 is an illustration that describes the number of random number bits per bit column that are in second bit state once the whitening algorithm described by the implementation described with respect to FIG. 5 is performed by the whitening circuitry shown in FIG. 1

FIG. 6 is an illustration that describes the number of random number bits per bit column that are in second bit state once the whitening algorithm described by the implementation described above with respect to FIG. 5 is performed by the whitening circuitry 16 shown in FIG. 1. As shown in FIG. 6, the whitening algorithm from FIG. 5 eliminates the bias from the memory cells of the memory 12 shown in FIG. 1.

Figure 7:
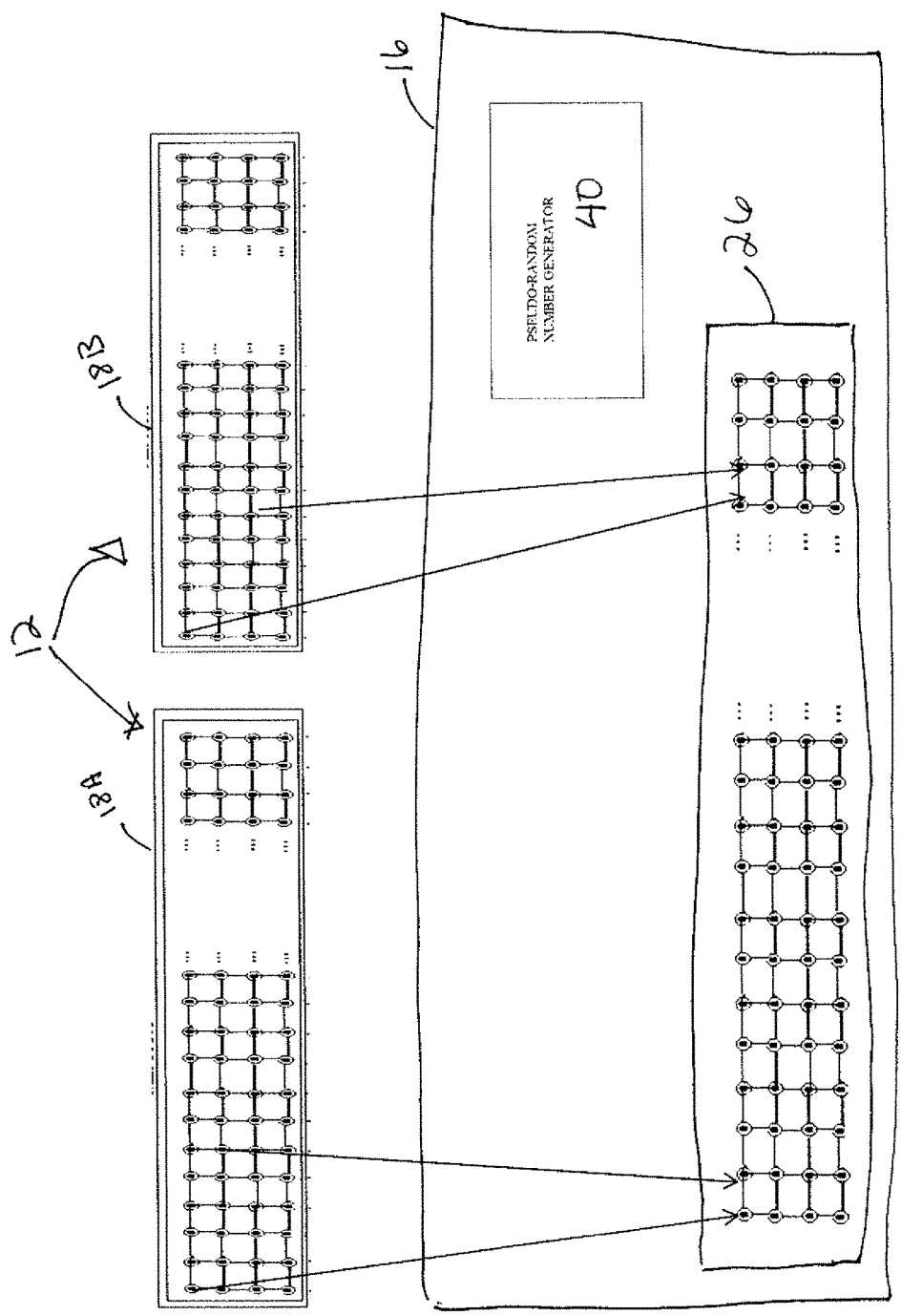
FIG. 7 illustrates an example of another type of whitening algorithm that may be implemented by one embodiment of the whitening circuitry shown in FIG. 1.

FIG. 7 illustrates an example of another type of whitening algorithm that may be implemented by one embodiment of the whitening circuitry 16 shown in FIG. 1. In this embodiment, random numbers 20 are also generated from random number bits in the buffer memory 26. In this embodiment, the random number bits of each of the random numbers 20 have bits states. Half of the random number bits in each of the random numbers have bit states that are set to be the same as the variable bit states from selected memory cells that are provided by the first memory block 18A. The other half of the random number bits in each of the random numbers 20 have bit states that are set to be the same as the variable bit states from selected memory cells that are provided by the second memory block 18B. In this case, the half the random number bits in each of the random numbers having bit states that are set to be the same as the variable bit states from selected memory cells of the first memory block 18A are consecutive random number bits equal to a number of memory cells per memory cell row in the first memory block 18A. The other half the random number bits in each of the random numbers having bit states that are set to be the same as the variable bit states from selected memory cells of the second memory block 18B are consecutive random number bits equal to a number of memory cells per memory cell row in the second memory block 18B. The number of memory cells per memory cell row in the first memory block 18A is the same as the number of memory cells per memory cell row in the second memory block 18B.

Each of the selected memory cells is selected by a pseudo-random number generator 40 provided by the whitening circuitry 16. For each of the random number bits set in accordance with the variable bit states from the memory cells in the first memory block 18A, the pseudo-random number generator 40 generates a pseudo random number that corresponds to a cell row position within the first memory block 18A and another pseudo random number that corresponds to cell column position within the first memory block 18A. The variable bit state stored by the memory cell in the first memory block 18A at the cell row position and cell column position corresponding to the pseudo-random numbers is provided as the bit state of the random number bit.

For each of the random number bits set in accordance with the variable bit states from the memory cells in the second memory block 18B, the pseudo random number generator 40 generates a pseudo random number that corresponds to a cell row position within the second memory block 18B and another pseudo random number that corresponds to cell column position within the second memory block 18B. The variable bit state stored by the memory cell in the second memory block 18B at the cell row position and cell column position corresponding to the pseudo-random numbers is provided as the bit state of the random number bit. The operation for this implementation goes as follows:

```
for (memory cell row 0 to memory cell row 255)
{
  for (bit 0 to bit 2048)
  {
    Append bit [row rand (of 256)] [bit rand (of 2048)] from
    first memory block 18A to the random number 20
```

```
  }
}
for (memory cell row 0 to memory cell row 255)
{
  for (bit 0 to bit 2048)
  {
    Append bit [row rand (of 256)] [bit rand (of 2048)] from
    second memory block 18B to the random number 20
  }
}
```

Figure 8:
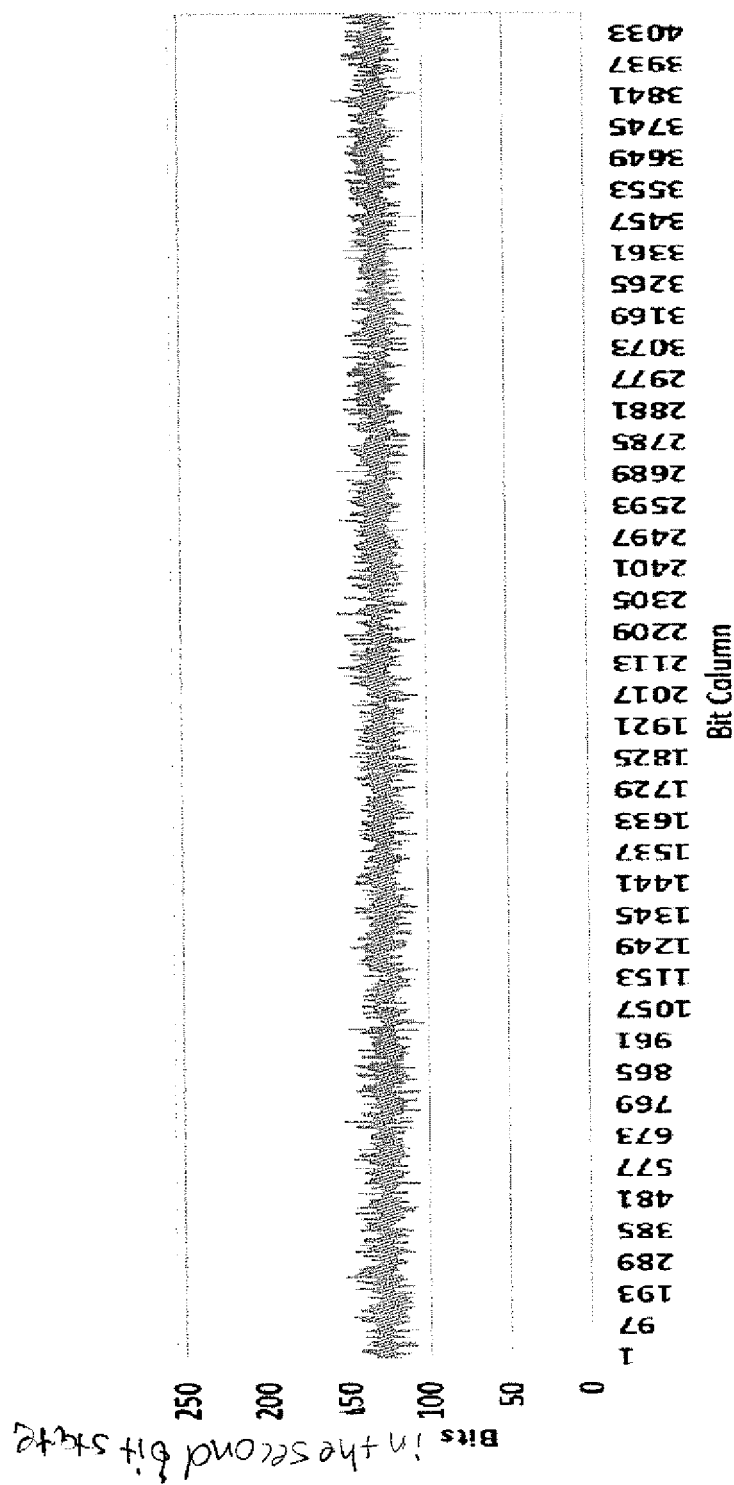
FIG. 8 is an illustration that describes the number of random number bits per bit column that are in second bit state once the whitening algorithm described by the implementation described with respect to FIG. 7 is performed by the whitening circuitry shown in FIG. 1.

FIG. 8 is an illustration that describes the number of random number bits per bit column that are in second bit state once the whitening algorithm described by the implementation described above with respect to FIG. 7 is performed by the whitening circuitry 16 shown in FIG. 1. As shown in FIG. 8, the whitening algorithm from FIG. 7 eliminates the bias from the memory cells of the memory 12 shown in FIG. 1. More specifically although some of the memory cells of the memory 12 are systematically biased to the first bit state, since the memory cells in the first memory block 18A and the memory cells in the second memory block 18B are selected pseudo-randomly, on average the random number bits of the random numbers have approximately a 50% chance of being in the first bit state and approximately a 50% chance of being in the second bit state, since the variable bit states are approximately 50% in the first bit state and approximately 50% in the second bit state after the first sequence and the second sequence of partial erase cycles.

Those skilled in the art will recognize improvements and modifications to the preferred embodiments of the present disclosure. All such improvements and modifications are considered within the scope of the concepts disclosed herein and the claims that follow.

What is claimed is:

1. Physically unclonable function (PUF) circuitry comprising:
    a memory comprising an array of memory cells operable to store variable bit states;
    a memory control circuit configured to:
        reset the array of memory cells so that the variable bit states stored by the array of memory cells are each provided in a first bit state;
        implement at least one sequence of memory cycles on the array of the memory cells in response to resetting the array of memory cells so that some of the variable bit states are retained in the first bit state and some of the variable bit states are each changed to a second bit state;
    whitening circuitry configured to:
        generate a random number comprising random number bits in response to the memory control circuit implementing the at least one sequence of memory cycles on the array of the memory cells; and
        provide the random number bits based on the variable bit states stored by the array of the memory cells, such that on average approximately half of the random number bits have the first bit state and half of random number bits have the second bit state.

2. The PUF circuitry of claim 1 wherein the memory is flash memory and the array of memory cells is an array of flash memory cells.

3. The PUF circuitry of claim 2 wherein each of the flash memory cells in the array of flash memory cells comprises floating gates and erase gates wherein manufacturing variation between the erase gate and floating gates between the flash memory cells in the array of flash memory cells provides an unclonable source of randomness.

4. The PUF circuitry of claim 1 wherein
the memory control circuit is configured to implement the at least one sequence of memory cycles on the array of the memory cells in response to resetting the array of memory cells so that approximately 50% of the variable bit states are retained in the first bit state and approximately 50% of the variable bit states are changed to the second bit state but wherein some of the memory cells are systematically biased to retain the first bit state.

5. The PUF circuitry of claim 4 wherein the whitening circuitry is configure to generate the random number having the random number bits so as to reduce the systematic bias so that on average approximately 50% of the random number bits are in the first bit state and on average approximately 50% of the random number bits are in the second bit state.

6. The PUF circuitry of claim 1 wherein:
the array of the memory cells comprises a first subarray of the memory cells and a second subarray of the memory cells wherein the first subarray of the memory cells are provided in a first memory block of the memory and the second subarray of the memory cells are provided in a second memory block of the memory;
the memory control circuit is configured to implement the at least one sequence of memory cycles on the array of the memory cells in response to resetting the array of memory cells by being configured to:
 implement a first sequence of the memory cycles on the first subarray of the memory cells until approximately 50% of the variable bit states stored by the first subarray of the memory cells are retained in the first bit state and approximately 50% of the variable bit states stored by the variable bit states stored by the first subarray of the memory cells are changed to the second bit value;
 implement a second sequence of the memory cycles on the second subarray of the memory cells until approximately 50% of the variable bit states stored by the second subarray of the memory cells are retained in the first bit state and approximately 50% of the variable bit states stored by the variable bit states stored by the first subarray of the memory cells are changed to the second bit value.

7. The PUF circuitry of claim 6 wherein the whitening circuitry is configured to generate the random number such that:
half the random number bits in the random number have bit states that are set to be the same as the variable bit states from a corresponding memory cell row and from selected memory cell columns that are provided by the first memory block;
an other half the random number bits in the random number have bit states that are set to be inverted with respect to the variable bit states from a corresponding memory cell row and from selected memory cell columns that are provided by the second memory block.

8. The PUF circuitry of claim 7 wherein the whitening circuitry interleaves the random number bits that are set based on the variable bit states from the first memory block with the random number bits that are set based on the variable bit states from the second memory block.

9. The PUF circuitry of claim 7 wherein the selected memory cell columns exclude excluded memory cell columns.

10. The PUF circuitry of claim 9 wherein the excluded memory cell columns include the memory cell columns with the highest column positions and the lowest column positions.

11. The PUF circuitry of claim 9 wherein the excluded memory cell columns include the memory cell columns with the highest column positions, the lowest column positions and the middle most column positions.

12. The PUF circuitry of claim 6 wherein:
half of the random number bits of the random number have bit states that are set to be the same as the variable bit states from selected memory cells that are provided by the first memory block;
an other half of the random number bits of the random number have bit states that are set to be the same as the variable bit states from selected memory cells that are provided by the second memory block.

13. The PUF circuitry of claim 12 wherein the whitening circuitry comprises a pseudo-random number generator wherein:
for each of the random number bits set in accordance with the variable bit states from the memory cells in the first memory block, the pseudo-random number generator generates a pseudo random number that corresponds to a cell row position within the first memory block and another pseudo random number that corresponds to cell column position within the first memory block and the variable bit state stored by the memory cell in the first memory block at the cell row position and cell column position from the second memory block corresponding to the pseudo-random number and the another pseudo-random number is provided as the bit state of the random number bit;
for each of the random number bits set in accordance with the variable bit states from the memory cells in the second memory block, the pseudo-random number generator generates a pseudo random number that corresponds to a cell row position within the second memory block and another pseudo random number that corresponds to cell column position within the second memory block and the variable bit state stored by the memory cell in the second memory block at the cell row position and cell column position from the second memory block corresponding to the pseudo-random number and the another pseudo-random number is provided as the bit state of the random number bit.

14. The PUF circuitry of claim 12 wherein
the half the random number bits in each of the random numbers having bit states that are set to be the same as the variable bit states from selected memory cells of the first memory block are consecutive random number bits equal to a number of memory cells per memory cell row in the first memory block; and
the other half the random number bits in each of the random numbers having bit states that are set to be the same as the variable bit states from selected memory cells of the second memory block are consecutive random number bits equal to a number of memory cells per memory cell row in the second memory block.

15. The PUF circuitry of claim 6 wherein the memory is flash memory and the array of memory cells is an array of flash memory cells.

16. The PUF circuitry of claim 15 wherein:
the first sequence of the memory cycles is a first sequence of partial erase cycles;
the second sequence of the memory cycles is a second sequence of partial erase cycles.

17. A method of providing a random number comprising:
resetting an array of memory cells so that variable bit states stored by the array of memory cells are each provided in a first bit state wherein the first bit state corresponds to a first bit value;
implementing at least one sequence of memory cycles on the array of the memory cells in response to resetting the array of memory cells so that some of the variable bit states are retained in the first bit state and some of the variable bit states are each changed to a second bit state;
generating the random number comprising random number bits in response to the memory control circuit implementing the at least one sequence of memory cycles on the array of the memory cells by providing the random number bits based on the variable bit states stored by the array of the memory cells, such that on average approximately half of the random number bits are in the first bit state and half of random number bits are in the second bit state.

18. The method of claim 17 wherein the array of the memory cells comprises a first subarray of the memory cells and a second subarray of the memory cells wherein the first subarray of the memory cells are provided in a first memory block of the memory and the second subarray of the memory cells are provided in a second memory block of the memory and wherein implementing the at least one sequence of memory cycles on the array of the memory cells in response to resetting the array of memory cells comprises:
implementing a first sequence of the memory cycles on the first subarray of the memory cells until approximately 50% of the variable bit states stored by the first subarray of the memory cells are retained in the first bit state and approximately 50% of the variable bit states stored by the variable bit states stored by the first subarray of the memory cells are changed to the second bit value;
implementing a second sequence of the memory cycles on the second subarray of the memory cells until approximately 50% of the variable bit states stored by the second subarray of the memory cells are retained in the first bit state and approximately 50% of the variable bit states stored by the variable bit states stored by the first subarray of the memory cells are changed to the second bit value.

19. The method of claim 18 wherein generating the random number comprises:
selecting half the random number bits in the random number have bit states that are set to be the same as the variable bit states from a corresponding memory cell row and from selected memory cell columns that are provided by the first memory block;
selecting an other half the random number bits in the random number have bit states that are set to be inverted with respect to the variable bit states from a corresponding memory cell row and from selected memory cell columns that are provided by the second memory block.

20. The method of claim 18, wherein:
for each of the random number bits set in accordance with the variable bit states from the memory cells in the first memory block, generate a pseudo random number that corresponds to a cell row position within the first memory block and another pseudo random number that corresponds to a cell column position within the first memory block and set the random number bit to be the same as the variable bit state stored by the memory cell in the first memory block at the cell row position and the cell column position;
for each of the random number bits set in accordance with the variable bit states from the memory cells in the second memory block, generate a pseudo random number that corresponds to a cell row position within the second memory block and another pseudo random number that corresponds to a cell column position within the second memory block and set the random number bit to be the same as the variable bit state stored by the memory cell in the second memory block at the cell row position and the cell column position.

* * * * *